(12) United States Patent
Kammermeier et al.

(10) Patent No.: US 8,171,608 B2
(45) Date of Patent: May 8, 2012

(54) TOOL AND METHOD FOR MACHINING A WORKPIECE, SUCH AS A MILLING TOOL FOR MACHINING A WORKPIECE, AND THE METHOD THEREOF

(75) Inventors: Dirk Kammermeier, Stein (DE); Karen Anne Craig, Greensburg, PA (US)

(73) Assignee: Kennametal Inc., Latrobe, PA (US)

( * ) Notice: Subject to any disclaimer, the term of this patent is extended or adjusted under 35 U.S.C. 154(b) by 1186 days.

(21) Appl. No.: 11/952,486

(22) Filed: Dec. 7, 2007

(65) Prior Publication Data

US 2008/0310929 A1    Dec. 18, 2008

Related U.S. Application Data

(63) Continuation-in-part of application No. PCT/EP2006/003730, filed on Apr. 22, 2006.

(51) Int. Cl.
*B23P 23/00* (2006.01)
*B23C 5/00* (2006.01)
*B23C 5/28* (2006.01)
*B24D 7/10* (2006.01)
*B24D 7/00* (2006.01)

(52) U.S. Cl. ............... 29/50; 451/70; 407/11; 407/33
(58) Field of Classification Search ........... 29/50, 566, 29/56.5; 451/69, 70, 461, 450; 407/11, 9, 407/30, 32, 31, 33, 34
See application file for complete search history.

(56) References Cited

U.S. PATENT DOCUMENTS

| | | | |
|---|---|---|---|
| 4,993,891 A | 2/1991 | Kaminiski et al. | |
| 5,285,600 A | 2/1994 | Shepley | |
| 5,667,428 A | 9/1997 | Lunn | |
| 5,816,892 A | 10/1998 | Lunn | |
| 6,081,980 A * | 7/2000 | Lunn | 29/50 |
| 7,125,205 B2 * | 10/2006 | Sheffler | 407/11 |
| 7,802,945 B2 * | 9/2010 | Sheffler et al. | 407/30 |
| 2004/0042858 A1 | 3/2004 | Sheffler | |

FOREIGN PATENT DOCUMENTS

| | | |
|---|---|---|
| EP | 0 398 467 | 11/1990 |
| JP | 63-283810 A1 | 11/1988 |
| JP | 01-103217 A1 | 4/1989 |
| JP | 7 171734 | 7/1995 |
| JP | 9 029529 | 6/1997 |
| WO | WO-2006/131170 A1 * | 12/2006 |

OTHER PUBLICATIONS

International Search Report PCT/EP2006/003730 and English translation thereof.

* cited by examiner

*Primary Examiner* — Erica E Cadugan
(74) *Attorney, Agent, or Firm* — Larry R. Meenan (57) ABSTRACT

Tool and method for machining a workpiece, such as a milling tool, including at least one cutting insert and including a grinding wheel, for machining a workpiece, and the method thereof. The grinding wheel is axially extendable relative to a base body of the tool via fluid actuation from a cooling fluid supply. Additionally, cooling fluid is also provided to a grinding surface of the grinding wheel.

14 Claims, 3 Drawing Sheets

TOOL AND METHOD FOR MACHINING A WORKPIECE, SUCH AS A MILLING TOOL FOR MACHINING A WORKPIECE, AND THE METHOD THEREOF

CONTINUING APPLICATION DATA

This application is a Continuation-In-Part application of International Patent Application No. PCT/EP2006/003730, filed on Apr. 22, 2006, which claims priority from Federal Republic of Germany Patent Application No. 10 2005 026 648.7, filed on Jun. 9, 2005. International Patent Application No. PCT/EP2006/003730 was pending as of the filing date of this application. The United States was an elected state in International Patent Application No. PCT/EP2006/003730.

BACKGROUND

1. Technical Field

The present application relates to a tool for machining a workpiece, such as a milling tool.

2. Background Information

Such a tool is known from U.S. Pat. No. 5,667,428. The machining of workpieces usually requires two different machining operations. First, a rough-machining of the workpiece, also called roughing, is effected, with which high metal-removal rates shall be achieved. For roughing, mostly diamond, ceramic or carbide cutting edges are used. After the rough-machining operation, the machined areas have a rough surface which must as a rule be reworked. This is done by the finishing or grinding operation, e.g. by means of a grinding wheel with sharp-edged diamond ICBN abrasive coatings. Contrary to roughing, only low metal-removal rates are reached in this case.

One of the differences between the two machining operations is the fact that they are usually effected at different rotational speeds of the tools, a far higher rotational speed being used for roughing. While for machining cast iron, cutting speeds up to 1000 meters per minute are used for roughing, the cutting speed for finishing amounts to only approx. 300 meters per minute. With a rotating tool having cutting inserts arranged on the periphery, the peripheral speed corresponds to the cutting speed. Another difference is the fact that grinding usually requires a coolant for cooling, i.e. a wet machining operation is effected. Contrary to this, roughing requires a dry machining operation, because the carbide or ceramic cutting edges are not very sensitive to thermal shocks.

It has already been tried to carry out the two machining operations by means of one tool. U.S. Pat. No. 4,993,891, for example, discloses a surface milling cutter for milling and grinding of a workpiece. On the outer edge of the peripheral side of the cylindrical surface milling cutter, a multitude of cutting inserts is mounted. Inwardly of the cutting inserts, on the underside, square grinding elements with abrasive surfaces are arranged in a circular row. The orientation of the grinding elements, which remove the traces of rough-machining and smooth the surface of the workpiece, is of importance in this surface milling cutter. The grinding elements have a small positive axial angle of inclination and a small lead angle, so that their radially inner edge is slightly lifted off from the grinding surface. Furthermore, the grinding elements have a radial angle of inclination and are, therefore, twisted in such a way that they offer a larger grinding surface. In operation, first of all the cutting inserts engage with the workpiece and mill it, followed by the grinding elements, which grind the workpiece. In this embodiment, the grinding elements are firmly mounted on the tool and have the same cutting speed as the cutting inserts, which amounts to approximately more than 1000 meters per minute. At this cutting speed, without coolant, the grinding elements pick up very quickly material removed from the workpiece, so that they have to be exchanged far more frequently than the cutting inserts.

OBJECT OR OBJECTS

It is an object of the present application to provide a cost-advantageous tool of simple structure for roughing and finishing of a workpiece. A further object of the application is to provide a method for machining a surface of a workpiece by means of this tool.

SUMMARY

The object concerning a tool is solved according to the present application by a tool for machining a workpiece, which is rotatable about an axis and has a tool base body with at least one cutting insert oriented towards a machining surface for roughing and a grinding element for finishing the workpiece. The grinding element is adjustable relative to the base body from a retracted rest position towards the machining surface into a machining position.

This embodiment makes it possible to use a conventional tool for machining a workpiece, possibly a surface milling cutter, by carrying out some small modifications on the structure, as a combined tool for both roughing and grinding of the workpiece. The two machining operations can be effected independently of each other, without the operating parameters and working conditions of one machining operation having any negative effects on the other.

To achieve this, the grinding element, which is designed as a grinding wheel, is adjusted during operation between the two positions. In its rest position, the grinding element is slightly retracted inwardly and is situated, during operation of the tool, at a distance from the machining surface. The latter is defined in a tool with several cutting inserts, for example a surface milling cutter, by the plane spread between the cutting inserts. In general, the machining surface coincides with the surface of the workpiece with which the cutting insert is engaged during operation. In this case, it is only the cutting insert of the tool that is engaged with the surface of the workpiece and effects a rough-machining operation. For a following finishing operation, the grinding element is pushed outwards, so that the grinding element is positioned farther outwardly at a distance from the cutting inserts and only the grinding element is engaged with the tool. The machining surface is in this case defined by the plane of the grinding element.

As the two machining processes may be effected separately of each other, it is possible to use a coolant for the finishing operation, without any risk of damaging the cutting insert, for example the ceramic insert.

Furthermore, the tool base body includes a displaceable pressure plate, which is mechanically connected with the grinding element. The pressure plate has an inner position and an outer position, correlated with the rest position and the machining position of the grinding element. When the grinding element is in its rest position, the pressure plate is in its inner position. To push the pressure plate into its outer position, a force is exerted on the pressure plate and transferred through the mechanical connection to the grinding element, which is in this way adjusted in its machining position. When this force does not act on the pressure plate any longer, the pressure plate returns into its inner position and with it, the grinding element returns into its rest position. This design is realized through simple and cost-advantageous technical means and guarantees a reliable use of the tool.

Furthermore, the pressure plate delimits a pressure space for a fluid. The fluid is, for example, a liquid or a gas mixture. During operation, a fluid is supplied into this pressure space, causing the pressure in the pressure space to rise, thus effecting a displacement of the pressure plate from its inner position to its outer position, respectively a displacement of the grinding element into machining position. The pressure plate will remain in its outer position as long as the pressure in the pressure space is high. That means that either the fluid is held in a closed pressure space or that, in case of an open pressure space, the pressure is kept stationary through constant feeding of the fluid. Therefore, the adjustment of the grinding element is effected in a simple manner hydraulically or pneumatically.

In addition, the tool base body includes a cooling-fluid supply pipe, which is connected with the pressure space through an opening. As for the finishing operation of the workpiece, usually a cooling fluid is supplied to the tool, the cooling function of the cooling fluid is skillfully used by this embodiment for switching over from roughing to finishing by means of a pressure function. An additional control is generally not necessary; rather does the grinding element move into machining position automatically when the cooling-fluid supply is switched on. For this purpose, the cooling fluid fills the pressure space and builds up a sufficiently high pressure there, which pushes the pressure plate from its inner into its outer position and thus adjusts the grinding element to the machining position. The necessary pressure is provided by the usual pressure of the cooling fluid, which is approximately in the range of over $10 \times 10^5$ Pa (pascals). In at least one possible embodiment of the present application, the pressure space is open through cooling-fluid channels in the direction of the machining surface, so that the cooling fluid can be supplied from the pressure space directly to the grinding element, where it cools the grinding element during operation. In this case, the same quantity of cooling fluid is continuously supplied into, and withdrawn from, the pressure space, in order to keep the grinding wheel safely in its machining position through the continuous supply of cooling fluid. Alternatively or additionally, a mechanical locking is provided.

Advantageously, an abutment is provided in the tool base body, limiting the displacement of the pressure plate relative to the machining surface. This abutment is positioned in such a way that, when the pressure plate hits the abutment, the grinding element is situated exactly in the defined machining position for the finishing operation. The abutment is formed of an inelastic hard material and cannot be bent or does not yield to the compressive force of the pressure plate. The abutment also reliably guarantees a repeated displacement of the grinding element into the exact machining position.

Expediently, the abutment is designed in the manner of a fastening ring. The ring is firmly attached to the tool base body by means of a non-positive connection, in one embodiment example by means of a screw connection. This allows a simple mounting of the abutment and, due to the ring-type design, a safe, defined bearing of the pressure plate.

In one embodiment example, the grinding element is held in the retracted rest position by means of a spring element. The spring element is either a pressure spring or a tension spring. A pressure spring is compressed, upon displacement of the pressure plate, under the pressure generated by the cooling fluid and upon release, it brings the pressure plate automatically into its initial position. In the case of a tension spring, the latter's ends are pulled apart when the pressure plate is displaced and when contracting, they pull the pressure plate back into its rest position. Therefore, an automatic and reliable return of the pressure plate into its retracted position is achieved by the spring element in a constructively simple manner.

Furthermore, in at least one possible embodiment of the present application, the spring element is arranged between the abutment and the pressure plate. In case of a pressure spring, this embodiment allows a loose insertion of the pressure spring, so that its ends are only supported by two bases. The abutment constitutes a stable base, supporting one end of the spring element. The other end is supported by the pressure plate, providing the second base.

The task aiming at a method is solved according to the application by a method for metal-cutting machining of a workpiece, according to which the grinding element is adjusted, for this method, from a retracted rest position into a machining position in engagement with the workpiece for finishing the workpiece.

The advantages described herein and the various embodiment examples of the tool can be applied analogously to this method, too.

The grinding element is displaced into machining position by means of a pressure generated by a fluid in the tool base body. The fluid is, in one embodiment example, a cooling lubricant fluid used for cooling and lubricating the grinding elements during the finishing operation. This cooling lubricant fluid is, furthermore, used for generating a sufficiently high pressure in the tool base body, by means of which the grinding wheel is pushed into machining position.

Expediently, only a minimum-quantity lubrication is provided for the finishing operation. For this purpose, an aerosol is supplied as cooling fluid. To form an aerosol, a cooling liquid is dispersed in a gas, such as in air, the volume fraction of the liquid being kept very small. In this case, only very small quantities of cooling lubricant are supplied, so that to a large extent, dry finishing of the workpiece is effected.

Advantageously, roughing and finishing are effected simultaneously. As the quantity of cooling liquid in the aerosol is very small, a simultaneous application of the two machining operations is possible without damaging the cutting insert through heavy thermal shocks due to the application of the cooling fluid.

Expediently, a cutting speed of 600 to 1200 meters per minute is adjusted for machining grey cast iron, and a cutting speed of 2000 to 10000 meters per minute, for machining light metal.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

In the following, some embodiments of the present application are explained in detail by means of the drawing, in which.

DESCRIPTION OF EMBODIMENT OR EMBODIMENTS

In the figures, parts having the same functions are marked with the same reference numbers.

Figure 1:
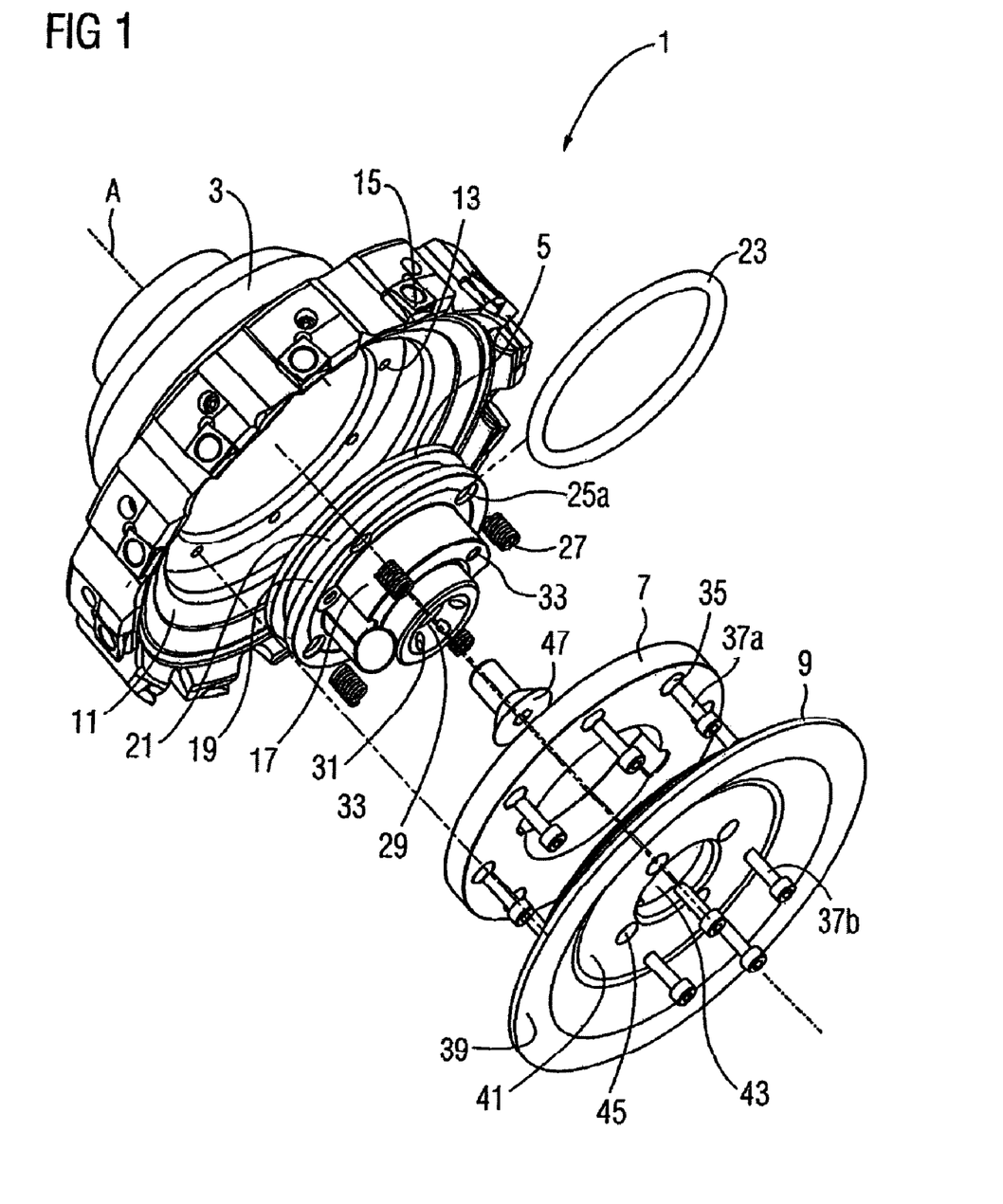
FIG. 1 is an exploded view of a tool for roughing and finishing of a workpiece.
Figure 2:
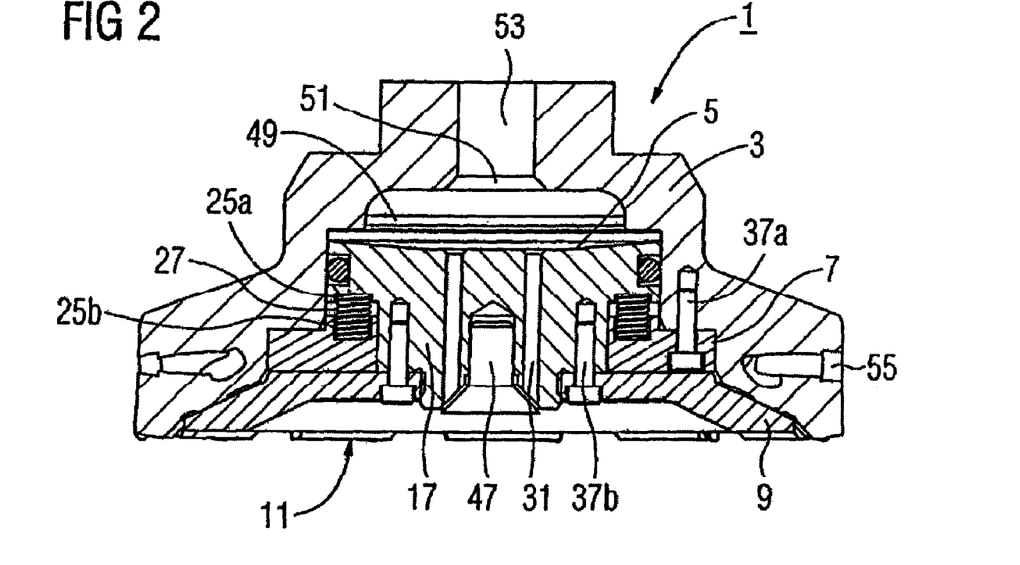
FIG. 2 is a cross-section through a tool according to FIG. 1 in working position for roughing a workpiece with the grinding element being in rest position.

FIG. 1 shows the individual components of a tool 1 for roughing and finishing of a workpiece. The tool 1 forms a combined milling and grinding tool based on a conventional surface milling cutter. The tool 1 includes a tool base body 3, a pressure plate 5, a fastening ring 7, and a grinding element 9. The different areas of the outer wall of the tool base body 3 are of cylindrical or conical shape, so that the tool is symmetrical around a rotational axis A. The inner space of the tool base body 3 is stepwise enlarged in the direction of a machining surface 11 (as seen in FIG. 2). In one of the steps, fastening holes 13, facing the machining surface 11, are formed, and usually provided with a thread. On the peripheral side of the tool base body 3, several cutting inserts 15, facing the machining surface 11, for roughing the workpiece are mounted. The machining surface 11 is defined for the roughing operation by the plane spread between the cutting inserts 15 normal to the axis A.

In the direction of the machining surface 11, the pressure plate 5 has a cylindrical shoulder 17, so that it is formed in the manner of a piston. The pressure plate 5 has a collar 19, which has along its peripheral side a groove 21, accommodating in assembled condition a sealing ring 23. Furthermore, the collar 19 is provided on its side facing the machining surface 11 with four holes 25a, into which the spring elements 27 are inserted. The shoulder 17 has in its center a central hole 29, surrounded by cooling-fluid channels 31 and drill holes 33.

In assembled condition, the fastening ring 7 is put on around the shoulder 17. The fastening ring 7 has a diameter which is larger than the diameter of the collar 19 of the pressure plate 5 and in the area of its peripheral wall, it is provided with several holes 35, through each of which a screw 37a is passed. When the fastening ring 7 is fastened in the tool base body 3, the screws 37 pass through the holes 35 and are then inserted into the fastening holes 13 and there, screwed into the tool base body 3.

The grinding element 9 has the shape of a hollow truncated cone, on the base of which a grinding ring 39 is attached. The fastening side 41 of the grinding element is provided with a central hole 43 as well as with holes 45. Screws 37b are passed through the holes 45 of the grinding element 9, said screws extending up to and into the drill holes 33 of the shoulder 17 and being screwed in there.

In an embodiment, a central screw 47 having a truncated, conical head 47a, and a screw stem or shank 47b is inserted through the central hole 43 of the grinding element 9 and through the central hole 29 of the pressure plate 5, which pressure plate has a cylindrical shoulder 17. The threaded screw stem 47b is screwed into the cylindrical shoulder 17. The conical screw head 47a is disposed within the conical opening 17a of the cylindrical shoulder 17 in which the cooling fluid channels 31 are located. A space 31a is formed between the conical screw head 47a and the conical opening 17a through which the cooling fluid passes. The angle of the conical screw head 47a and the conical opening 17a may be chosen to assist in directing fluid to desired portions of the grinding element 9.

Fluid flow characteristics of the cooling fluid can be changed by increasing or decreasing the size of the space 31a between the screw head 47a and the cooling fluid channels 31, thereby generally increasing or decreasing the amount of cooling fluid flowing through the cooling fluid channels 31, and thus the amount of cooling fluid which is delivered to the grinding element 9.

Figure 3:
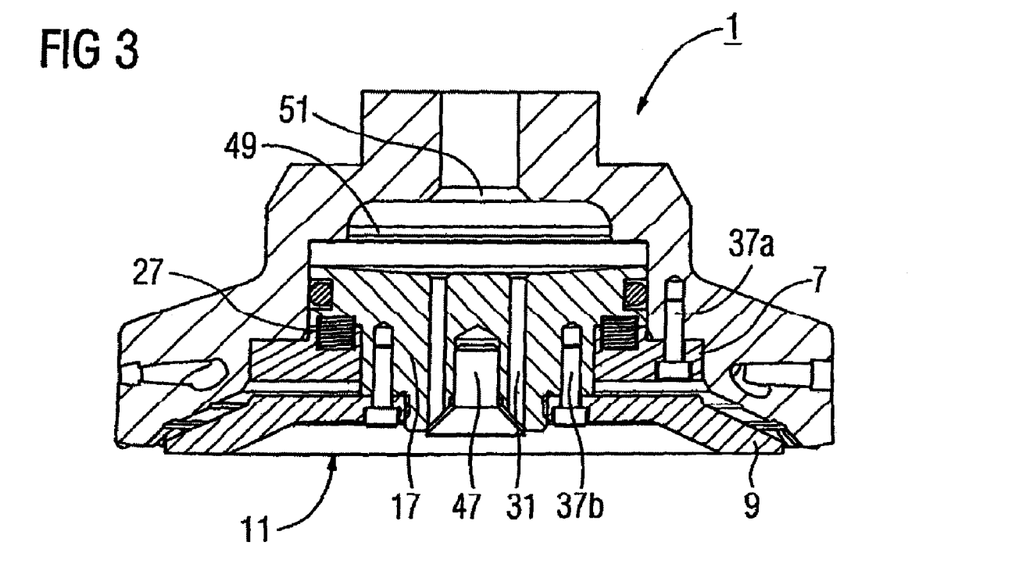
FIG. 3 is a cross-section through a tool according to FIG. 1 in working position for finishing a workpiece with the grinding element being in machining position.

The pressure transmitted through the cooling supply pipe 53 and into the pressure space 49, which pressure in the pressure space 49 acts upon the pressure plate 5. This pressure can be varied to effect the position of the grinding element 9 between the retracted position, as shown in FIG. 2 and the fully extended position, as shown in FIG. 3. The pressure range may be affected by the amount of cooling fluid flowing out of the space 31a, depending upon the dimensions of the cooling fluid channels 31 and the space 31a.

Furthermore, the size of the space 31a may have a correspondence to the length of the screw stem 47b and/or the extent to which the screw 47 is inserted into the central hole 29. A screw stem 47b of greater length or one not extending far into the central hole will generally allow the conical screw head 47a to be disposed farther away from the cooling fluid channels 31, creating a greater space 31a and permitting greater fluid flow. Conversely, a screw stem 47b of shorter length or the screw 47 being inserted further into the central hole 29 of the cylindrical shoulder 17, may position the conical screw head 47a closer to the cooling fluid channels 31, diminishing the space 31a and generally decreasing the fluid flow.

Different screw lengths and/or varying pressures may be used to accommodate to different conditions created by the type of material being finished by the grinding element 9 and also the type of material which the grinding element is made of. Therefore, different flow rates and different speeds of operation can be used for different materials and the different finishes desired of the material being finished.

The desired position of the grinding element 9 against the material being finished may be achieved by varying the pressure in the cooling supply pipe 53 and thus the pressure space 49. The pressure in the pressure space 49 could and/or does alter the position of the grinding element 9 such that the grinding element 9 may be in an intermediate position between the position shown in FIG. 2 and the position shown in FIG. 3.

The varying force or pressure exerted by the grinding element 9 could be varied to accommodate to different materials and different cutting speeds of the milling tool 1. The various adjustments of the position and pressure of grinding element 9 could be determined by experimentation which could then be recorded into some type of information storage medium such as a computer or computer assisted storage unit or apparatus or even on printed matter. Therefore, the cutting speed, the flow of cooling fluid across the grinding element 9, the pressure of grinding element 9 with respect to the workpiece, and the position of the grinding element 9, could be optimized for a cutting and finishing task depending upon the material being cut and finished and/or the specifications and desired characteristics for the finished product produced by the milling tool 1.

As can be seen in FIG. 2, the linear speed of a grinding element 9 across a workpiece would be less than the linear speed of the cutting inserts 15. Therefore by varying the dimensions of the grinding element 9 with relation to the position of the cutting inserts 15, an optimization of the cutting speed of the cutting inserts 15 and an optimization of the grinding speed of the grinding element 9 could possibly be achieved. As can be seen from FIG. 2 and FIG. 3, if the outer diameter and inner diameter of the grinding area of the grinding element 9, which grinding area comes into contact with the workpiece during operation, are varied, a substantial difference can be achieved between the cutting speed of the cutting inserts 15 and the grinding speed of the grinding element 9. Depending upon the material being machined, the outer diameter and inner diameter of the grinding element 9 can be varied to achieve an optimal or nearly optimal grinding speed of the grinding surface of the grinding element 9 with respect to the diameter at which the cutting inserts 15 are located.

FIG. 2 shows a cross-section of the tool 1 according to FIG. 1. The grinding element 9 is situated in its retracted rest position, i.e. the tool 1 is in its working position for rough-machining of the workpiece. The fastening ring 7 is fixed in the tool base body 3 by means of the screws 37a. The side of the fastening ring 7 facing away from the machining surface 11 includes holes 25b corresponding with the holes 25a of the pressure plate 5, into which the spring elements 27 are inserted. The spring elements 27 are in this exemplary embodiment pressure springs, and their ends need not to be fixed, but are just supported by the fastening ring 7 and the pressure plate 5. During operation of the tool 1, the fastening ring 7 lies under the pressure plate 5, i.e. the pressure plate 5 is held in its inner position by the spring tension of the spring elements 27. Above the pressure plate 5 and delimited by it, a pressure space 49 is formed, which is connected with a cooling-fluid supply pipe 53 through an opening 51. In this working position of the tool 1, the pressure in the pressure space 49 is not higher than the ambient pressure. The tool base body 3 includes on its peripheral side adaptors 55 for the cutting inserts 15 according to FIG. 1.

To move the tool 1 into its working position for finishing the workpiece, the pressure space 49 is filled with cooling fluid through an opening 51, the pressure plate 5 being loaded with the cooling fluid, which is, in at least one embodiment, pressurized with approx. at least $10 \times 10^5$ Pa (pascals), so that it is pushed into its outer position, as shown in FIG. 3. When the pressure plate 5 is axially displaced, the spring elements 27 are loaded and pressed. Thereby, the pressure plate 5 can be axially shifted until it rests on the fastening ring 7 forming an abutment. The grinding element 9, connected by means of the screws 37b with the shoulder 17 of the pressure plate 5, is pressed down towards the machining surface 11 when the pressure plate 5 is shifted, thus reaching its machining position. The pressure space 49 is fluidically connected through the cooling-fluid channels 31 with the central hole 43 of the grinding element 9. The diameter of the central hole 43 is larger than the diameter of the central screw 47, so that the cooling fluid, after flowing out of the cooling-fluid channels 31, reaches the machining surface 11 through the central screw 47 and cools the grinding element 9 and the surface of the grinding element 9 during operation of the tool.

With an alternate use of the cutting inserts 15 and the grinding element 9, the machining surface 11 is defined, in the finishing operation, by the plane in which the grinding element 9 lies. During its operation, the grinding element 9 is positioned, relative to the tool base body 3, a little farther axially outwards than the cutting inserts 15, so that the machining surface 11 is also shifted outwards. Alternatively to the alternate use, it is provided, with minimum-quantity lubrication, to carry out the roughing and finishing operations simultaneously.

When the two machining operations are carried out simultaneously, the cutting inserts 15 and the grinding element 9 lie in a plane coinciding with the machining surface 11. Both for alternate and for simultaneous operations, the rotational speed is the same for roughing and finishing.

To return the grinding element 9 into its rest position, the supply of cooling fluid into the pressure space 49 is interrupted. The spring tension of the spring elements 27 presses the pressure plate 5 upwards until the pressure plate 5 is situated again in its inner position corresponding to the rest position of the grinding element 9.

Figure 3A:
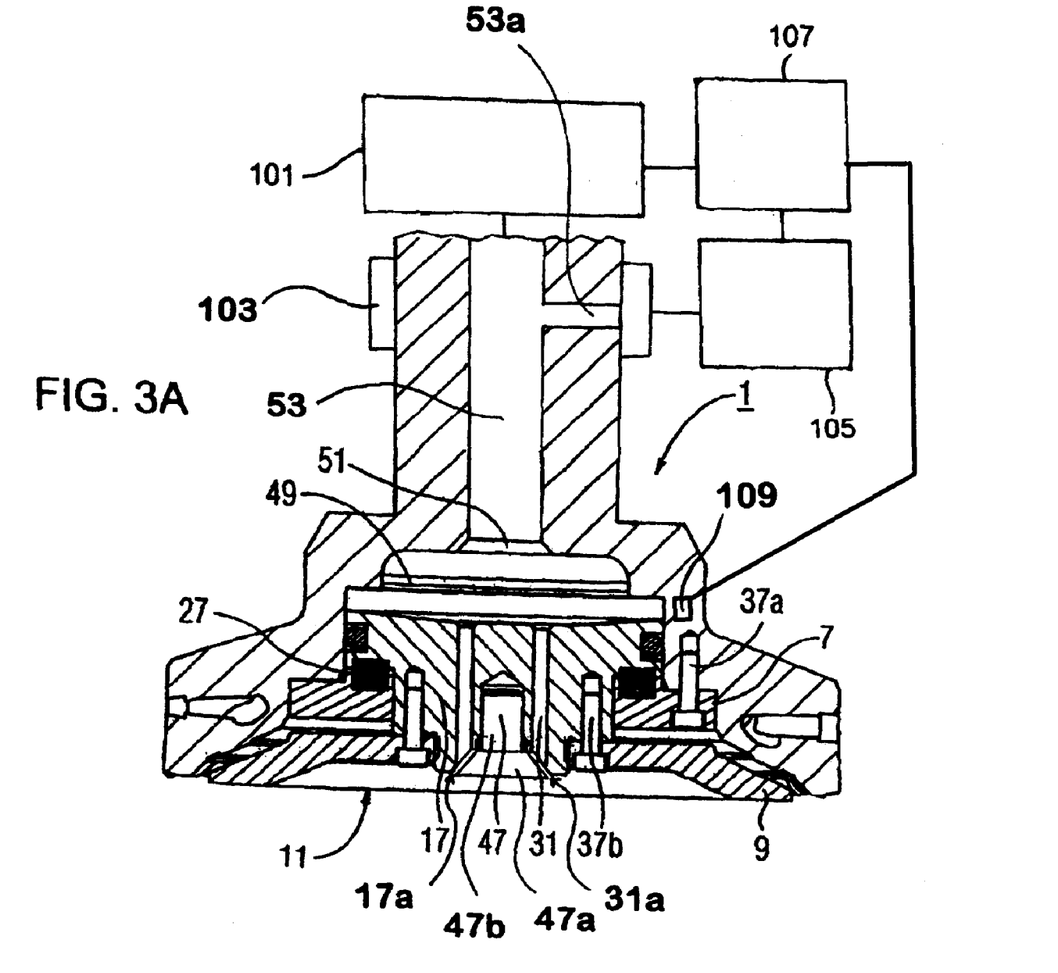
FIG. 3A is a cross-section through a tool according to FIG. 1, showing the tool connected to a drive unit and an aerosol generator or cooling fluid pump.

As shown in FIG. 3A, the motor or drive unit 101 rotates the tool 1 about its axis A, therefore rotating the tool base body 3, wherein at least one cutting insert 15 is located, and simultaneously rotating the grinding element 9. The cooling fluid supply pipe 53 is connected to an annular coupling 103 via at least one supply channel 53a, which supplies cooling fluid to the cooling fluid supply pipe 53 The coupling 103 connects the aerosol generator or cooling fluid pump 105 to the at least one channel 53a and the cooling fluid supply pipe 53. Since the coupling 103 is disposed annularly about the shaft of the tool 1, the coupling 103 could enclose a plurality of openings and supply channels in the shaft of the tool 1. Cooling fluid, which in one embodiment is in the form of an aerosol, is supplied to the pressure space 49 through the cooling fluid supply pipe 53, for adjusting the pressure plate 5 and thus the grinding element 9 into machining position and also supplies cooling fluid to the grinding surface of the grinding element 9 during machining. A controller 107, such as a computer controlled controller, is operatively connected to both the motor 101 and the aerosol generator and aerosol pump or cooling fluid pump 105, for controlling speed of the motor 101 and output function of the aerosol generator and aerosol pump or cooling fluid pump 105. Additionally, in FIG. 3A a locking mechanism 109 is shown which is controlled by the controller 107.

One feature or aspect of an embodiment is believed at the time of the filing of this patent application to possibly reside broadly in a tool 1 for machining a workpiece, rotatable about an axis A, having a tool base body 3 with at least one cutting insert 15 facing a machining surface 11 for rough-machining and a grinding element 9 for finishing the workpiece, the grinding element 9 being adjustable, relative to the tool base body 3, from a retracted rest position towards the machining surface 11 into a machining position, characterized in that a pressure plate 5 displaceable in the tool base body 3 is provided, which is mechanically connected with the grinding element 9 and which delimits a pressure space 49 for a fluid, the tool base body 3 comprising a cooling-fluid supply pipe 53, connected with the pressure space 49 through an opening 51.

The components disclosed in the various publications, disclosed or incorporated by reference herein, may possibly be used in possible embodiments of the present invention, as well as equivalents thereof.

Another feature or aspect of an embodiment is believed at the time of the filing of this patent application to possibly reside broadly in the tool 1 characterized in that the pressure space 49 is open through cooling-fluid channels 31 in the direction of the machining surface 11.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

Yet another feature or aspect of an embodiment is believed at the time of the filing of this patent application to possibly reside broadly in the tool 1 characterized in that a abutment 7 is provided in the tool base body 3, which limits the displacement of the pressure plate 5 relative to the machining surface 11.

The appended drawings in their entirety, including all dimensions, proportions and/or shapes in at least one embodiment of the invention, are accurate and are hereby included by reference into this specification.

Still another feature or aspect of an embodiment is believed at the time of the filing of this patent application to possibly reside broadly in the tool 1 characterized in that the abutment is designed in the manner of a fastening ring 7.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

A further feature or aspect of an embodiment is believed at the time of the filing of this patent application to possibly reside broadly in the tool 1 characterized in that the grinding element 9 is held in the retracted rest position by means of a spring element 27.

All, or substantially all, of the components and methods of the various embodiments may be used with at least one embodiment or all of the embodiments, if more than one embodiment is described herein.

Another feature or aspect of an embodiment is believed at the time of the filing of this patent application to possibly reside broadly in the tool 1 characterized in that a pressure-spring element 27 is arranged between the abutment and the pressure plate 5.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

Yet another feature or aspect of an embodiment is believed at the time of the filing of this patent application to possibly reside broadly in a method for metal-cutting machining of a workpiece by means of a tool 2 which is rotated about an axis A, having a tool base body 3 with at least one cutting insert 15 for rough-machining and a grinding element 9 for finishing the workpiece, wherein, for finishing the workpiece, the grinding element 9 is adjusted relative to the tool base body 3 from a retracted rest position into a machining position in engagement with the workpiece, characterized in that a pressure plate 5 displaceable in the tool base body 3 is provided, which is mechanically connected with the grinding element 9 and delimits a pressure space 49 for a fluid, the grinding element 9 being displaced into the machining position by means of pressure generated by a fluid in the pressure space 49.

All of the patents, patent applications and publications recited herein, and in the Declaration attached hereto, are hereby incorporated by reference as if set forth in their entirety herein.

Still another feature or aspect of an embodiment is believed at the time of the filing of this patent application to possibly reside broadly in the method characterized in that an aerosol is supplied as cooling fluid.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

A further feature or aspect of an embodiment is believed at the time of the filing of this patent application to possibly reside broadly in the method characterized in that the roughing and finishing operations are effected simultaneously.

Another feature or aspect of an embodiment is believed at the time of the filing of this patent application to possibly reside broadly in the method characterized in that for machining grey cast iron, a cutting speed of 600 to 1200 meters per minute, and for machining light metal, a cutting speed of 2000 to 10000 meters per minute is set.

It will be understood that any or all of the examples of patents, published patent applications, and other documents which are included in this application and including those which are referred to in paragraphs which state "Some examples of . . . which may possibly be used in at least one possible embodiment of the present application . . . " may possibly not be used or useable in any one or more or any embodiments of the application.

The sentence immediately above relates to patents, published patent applications and other documents either incorporated by reference or not incorporated by reference.

All of the patents, patent applications or patent publications, which were cited in the International Search Report dated Jul. 26, 2006, and/or cited elsewhere are hereby incorporated by reference as if set forth in their entirety herein as follows: U.S. Pat. No. 5,667,428 A, U.S. Pat. No. 5,285,600 A, EP 0 398 467 A, U.S. Pat. No. 5,816,892 A, JP 09 029529 A, JP 07 171734 A, and U.S. 2004/042858 A1.

The corresponding foreign and international patent publication applications, namely, Federal Republic of Germany Patent Application No. 10 2005 026 648.7, filed on Jun. 9, 2005, having inventors Dirk Kammermeier and Karen Anne Graig, and DE-OS 10 2005 026 648.7 and DE-PS 10 2005 026 648.7, and International Application No. PCT/EP2006/003730, filed on Apr. 22, 2006, having WIPO Publication No. WO 2006/131170 A1 and inventors Dirk Kammermeier and Karen Anne Graig, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

Some examples of aerosol generators which may possibly be used in at least one possible embodiment are: U.S. Pat. No. 6,736,379 B1, entitled Device for Generating an Aerosol, issued on May 18, 2004 and U.S. Pat. No. 7,173,222 B2, entitled Aerosol Generator Having Temperature Controlled Heating Zone and Method of Use Thereof, issued on Feb. 6, 2007 and U.S. Pat. No. 4,129,427, entitled Apparatus for Contacting and Aerosol Stream with a Liquid, issued on Dec. 12, 1978.

Various types of grinding wheels can be used for grinding different materials to desired finishes which may vary depending upon the needs of the end user of the workpieces. Such grinding wheels may include diamond wheels or CBN (Borazon) wheels and any other type of grinding wheel which may be appropriate for a particular task.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

One feature or aspect of an embodiment is believed at the time of the filing of this patent application to possibly reside broadly in a milling tool being rotatable about an axis, for machining a workpiece, said milling tool comprising: a milling tool base body, rotatable about said axis, with at least one cutting insert, rotatable about said same axis, disposed to permit machining of a workpiece for rough-machining; a grinding wheel comprising a grinding surface configured to be disposed towards and for finishing a workpiece subsequent to rough machining by said at least one cutting insert; said grinding wheel and said at least one cutting insert being disposed to rotate about the same axis which axis is the axis of rotation of said milling tool base body; said grinding wheel being disposed at least partially within said tool base body and being rotatable about said axis; said grinding wheel being adjustably retractable, relative to said tool base body, from a retracted rest position disposed away from a machining surface to a position in contact with a machining surface and from a position in contact with a machining surface to a retracted rest position disposed away from a machining surface; a displaceable body, mechanically connected to said grinding wheel, being disposed and configured to displace said grinding wheel from a retracted rest position disposed away from a machining surface to a position in contact with a machining surface and from a position in contact with a machining surface to a retracted rest position disposed away from a machining surface; a cooling fluid supply being disposed and configured to supply cooling fluid to said displaceable body and said grinding surface of said grinding wheel; a pressure chamber connected to said cooling fluid supply; said displaceable body comprising a wall of said pressure chamber; said cooling fluid supply being operatively connected through said pressure chamber to said displaceable body to communicate cooling fluid to said displaceable body and displace and retract said grinding wheel from a retracted rest position disposed away from a machining surface to a position in contact with a machining surface and from a position in contact with a machining surface to a retracted rest position disposed away from a machining surface; a passage, comprising an orifice, operatively connecting said cooling fluid supply to said grinding wheel, being configured and disposed to supply cooling fluid from said pressure chamber to said grinding surface of said grinding wheel; said passage being configured and dimensioned to sufficiently restrict flow of cooling fluid to maintain a pressure in said pressure chamber sufficient to position said grinding wheel in contact with a machining surface; and said passage also being configured and dimensioned to provide and direct sufficient pressurized cooling fluid to said grinding element in a sufficient quantity to cool said grinding element and also in a quantity to minimize thermal stressing of said at least one cutting insert.

Another feature or aspect of an embodiment is believed at the time of the filing of this patent application to possibly reside broadly in a milling tool wherein said pressure chamber is open to said passage and wherein said passage comprises cooling fluid channels configured and disposed to lead a cooling fluid in the direction of a machining surface and to cool at least said grinding surface of said grinding element; and said displaceble body comprises a pressure plate disposed to receive pressure from said cooling fluid.

Yet another feature or aspect of an embodiment is believed at the time of the filing of this patent application to possibly reside broadly in a milling tool including an abutment in the tool base body, which abutment is configured to limit the displacement of the pressure plate relative to a machining surface.

Still another feature or aspect of an embodiment is believed at the time of the filing of this patent application to possibly reside broadly in a milling tool wherein said abutment comprises a fastening ring.

A further feature or aspect of an embodiment is believed at the time of the filing of this patent application to possibly reside broadly in a milling tool, including at least one spring element configured to hold said grinding wheel in a retracted rest position.

Another feature or aspect of an embodiment is believed at the time of the filing of this patent application to possibly reside broadly in a milling tool wherein said at least one spring element comprises a plurality of pressure-spring elements disposed between said abutment and said pressure plate.

Yet another feature or aspect of an embodiment is believed at the time of the filing of this patent application to possibly reside broadly in a method for metal-cutting machining of a workpiece with a metal cutting tool, said metal cutting tool comprising: a tool base body, rotatable about an axis, with at least one cutting insert disposed to permit machining of a workpiece for rough-machining; a grinding element comprising a grinding surface for finishing a workpiece subsequent to rough machining by said at least one cutting insert; said grinding element being adjustably retractable, relative to said tool base body, from a retracted rest position disposed away from a machining surface to a position in contact with a machining surface and from a position in contact with a machining surface to a retracted rest position disposed away from a machining surface; a cooling fluid supply being disposed and configured to supply cooling fluid to said grinding surface of said grinding element; said cooling fluid supply being operatively connected to said grinding element to communicate cooling fluid to said grinding element and being operatively connected to said grinding element to displace and retract said grinding element from a retracted rest position disposed away from a machining surface to a position in contact with a machining surface and from a position in contact with a machining surface to a retracted rest position disposed away from a machining surface; said cooling fluid supply comprising an orifice, operatively connecting said cooling fluid supply to said grinding element; said orifice being configured and disposed to supply cooling fluid to said grinding surface of said grinding element; said method comprising; rough cutting a workpiece with said at least one cutting insert by rotating said tool base body; finishing a surface of a workpiece by grinding a workpiece with said grinding element by extending said grinding element from a retracted position out of contact with a machining surface to an extended position in contact with a machining surface; providing a pressurized cooling fluid, from said cooling fluid supply, to displace said grinding element from a retracted rest position to a position in contact with a machining surface; using a portion of a cooling fluid, from said cooling fluid supply, and cooling said grinding element during grinding; sufficiently restricting flow of cooling fluid to maintain a pressure in said pressure chamber sufficient to position said grinding wheel in contact with a machining surface; and releasing and directing sufficient pressurized cooling fluid to said grinding element in a sufficient quantity to cool said grinding element and also in a quantity to minimize thermal stressing of said at least one cutting insert.

Still another feature or aspect of an embodiment is believed at the time of the filing of this patent application to possibly reside broadly in a method wherein: said using a portion of a cooling fluid, from said cooling fluid supply, for cooling said grinding element during grinding comprises using a portion of the cooling fluid being used to displace and extend said grinding element, for cooling said grinding element during grinding.

A further feature or aspect of an embodiment is believed at the time of the filing of this patent application to possibly reside broadly in a method including a displaceable body, mechanically connected to said grinding element, being disposed and configured to displace said grinding element from a retracted rest position disposed away from a machining surface to a position in contact with a machining surface and from a position in contact with a machining surface to a retracted rest position disposed away from a machining surface; a pressure chamber connected to said cooling fluid supply; said displaceable body comprising a wall of said pressure chamber; a passage connected to said orifice, said passage being configured to restrict flow of cooling fluid from said pressure chamber to maintain a pressure in said pressure chamber sufficient to position said grinding wheel in contact with a machining surface; said method comprising the further steps of: flowing cooling fluid from said cooling fluid supply to said pressure chamber to extend said grinding element said grinding element by extending said grinding element from a retracted position out of contact with a machining surface to an extended position in contact with a machining surface; and sufficiently restricting flow of pressurized cooling fluid though said passage and said orifice to maintain sufficient pressure in said pressure chamber to extend said grinding element from a retracted position out of contact with a machining surface to an extended position in contact with a machining surface while permitting sufficient cooling fluid through said passage and said orifice to cool said grinding element during cooling.

Another feature or aspect of an embodiment is believed at the time of the filing of this patent application to possibly reside broadly in a method including an aerosol generator for supplying the cooling fluid; generating a pressurized aerosol cooling fluid and leading said pressurized cooling fluid through said pressure chamber, and pressurizing said displaceable body and moving said grinding element to said extended and retracted positions and leading said pressurized cooling fluid through said passage and said orifice to said grinding element in a sufficient quantity to cool said grinding element and also in a quantity to minimize thermal stressing and thermal shocking of said at least one cutting insert.

Yet another feature or aspect of an embodiment is believed at the time of the filing of this patent application to possibly reside broadly in a method including simultaneously performing said roughing and said finishing simultaneously; wherein said pressure chamber is connected to and open to said passage and wherein said passage comprises a plurality of cooling fluid channels disposed to lead a cooling fluid in the direction of a machining surface; said method further comprising: leading cooling fluid through said plurality of cooling fluid channels.

Another feature or aspect of an embodiment is believed at the time of the filing of this patent application to possibly reside broadly in a method wherein said machining comprises one of a) and b) wherein a) and b) are: a) machining grey cast iron, at a cutting speed of 600 to 1200 meters per minute, and b) machining light metal, at a cutting speed of 2000 to 10000 meters per minute.

Yet another feature or aspect of an embodiment is believed at the time of the filing of this patent application to possibly reside broadly in a tool, being rotatable about an axis, for machining a workpiece, said tool comprising; a tool base body, rotatable about said axis, with at least one cutting insert disposed to permit machining of a workpiece for rough-machining; a grinding element comprising a grinding surface for finishing the workpiece subsequent to rough machining by said at least one cutting insert; said grinding element being configured and disposed to be retracted towards and extended from said tool body; said grinding element being adjustably retractable, relative to said tool base body, from a retracted rest position disposed away from a machining surface to a position in contact with a machining surface and from a position in contact with a machining surface to a retracted rest position disposed away from a machining surface; a displaceable body, mechanically connected to said grinding element, being disposed and configured to displace said grinding element from a retracted rest position disposed away from a machining surface to a position in contact with a machining surface and from a position in contact with a machining surface to a retracted rest position disposed away from a machining surface; a cooling fluid supply being disposed and configured to supply cooling fluid to said displaceable body and said grinding surface of said grinding element; said cooling fluid supply being operatively connected to said displaceable body to communicate cooling fluid to said displaceable body and displace and retract said grinding element from a retracted rest position disposed away from a machining surface to a position in contact with a machining surface and from a position in contact with a machining surface to a retracted rest position disposed away from a machining surface; an orifice, operatively connecting said cooling fluid supply to said grinding element, being configured and disposed to supply cooling fluid from said cooling fluid supply to said grinding surface of said grinding element.

Still another feature or aspect of an embodiment is believed at the time of the filing of this patent application to possibly reside broadly in a tool further comprising; a pressure chamber connected to said cooling fluid supply; said displaceable body comprising a wall of said pressure chamber; wherein said passage is open to and connected to said pressure chamber.

A further feature or aspect of an embodiment is believed at the time of the filing of this patent application to possibly reside broadly in a tool wherein said passage comprises a plurality of cooling fluid channels disposed to lead a cooling fluid in the direction of a machining surface and said displaceble body comprises a pressure plate disposed to receive pressure in said pressure chamber from said cooling fluid.

Another feature or aspect of an embodiment is believed at the time of the filing of this patent application to possibly reside broadly in a tool including an abutment in the tool base body, which abutment is configured to limit the displacement of the pressure plate relative to a machining surface.

Yet another feature or aspect of an embodiment is believed at the time of the filing of this patent application to possibly reside broadly in a tool wherein said abutment comprises a fastening ring.

Still another feature or aspect of an embodiment is believed at the time of the filing of this patent application to possibly reside broadly in a tool including a spring element configured to hold said grinding wheel in a retracted rest position.

A further feature or aspect of an embodiment is believed at the time of the filing of this patent application to possibly reside broadly in a tool wherein said spring element comprises a pressure-spring element disposed between said abutment and said pressure plate.

Another feature or aspect of an embodiment is believed at the time of the filing of this patent application to possibly reside broadly in a tool in combination with an aerosol generator wherein said aerosol generator is configured to supply an aerosol as a sole cooling fluid and said method further comprising supplying and aerosol to said pressure chamber and through said passage and said orifice at least to said grinding surface of said grinding element.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A milling tool, being rotatable about an axis, for machining a workpiece, said milling tool comprising:
  a milling tool base body, rotatable about said axis, with at least one cutting insert, rotatable about said same axis, said at least one cutting insert being disposed to permit machining of the workpiece for rough-machining;
  a grinding wheel comprising a grinding surface configured to be disposed towards the workpiece and configured for finishing the workpiece subsequent to rough machining by said at least one cutting insert;
  said grinding wheel and said at least one cutting insert being disposed to rotate about the same axis, which axis is the axis of rotation of said milling tool base body;
  said grinding wheel being disposed at least partially within said tool base body and being rotatable about said axis;
  said grinding wheel being adjustably extendable, relative to said tool base body, from a retracted rest position disposed away from a machining position of the grinding wheel to an extended active position which is the machining position of the grinding wheel, and being adjustably retractable from the extended active position to the retracted rest position;
  a displaceable body, mechanically connected to said grinding wheel, being disposed and configured to displace said grinding wheel from the retracted rest position to the extended active position, and from the extended active position to the retracted rest position;
  a cooling fluid supply being disposed and configured to supply cooling fluid to said displaceable body and said grinding surface of said grinding wheel;
  a pressure chamber connected to said cooling fluid supply;
  said displaceable body comprising a wall of said pressure chamber;
  said cooling fluid supply being operatively connected through said pressure chamber to said displaceable body to communicate cooling fluid to said displaceable body to displace said grinding wheel from the retracted rest position to the extended active position, and to permit retraction of said grinding wheel from the extended active position to the retracted rest position;
  at least one retracting element being configured and disposed to produce a force on said displaceable body to retract said grinding wheel from the extended active position to the retracted rest position upon reduction of pressure in said pressure chamber;

a passage, operatively connecting said cooling fluid supply to said grinding wheel, being configured and disposed to supply cooling fluid from said pressure chamber to said grinding surface of said grinding wheel;

said passage being configured and dimensioned to sufficiently restrict flow of cooling fluid to maintain a pressure in said pressure chamber sufficient to position said grinding wheel in said extended active position in contact with a machining surface; and said passage also being configured and dimensioned to provide and direct pressurized cooling fluid to said grinding wheel to cool said grinding wheel.

2. The milling tool according to claim 1, wherein said pressure chamber is open to said passage and wherein said passage comprises cooling fluid channels configured and disposed to lead a cooling fluid in a direction towards the grinding surface and to cool at least said grinding surface of said grinding wheel; and said displaceable body comprises a pressure plate disposed to receive pressure from said cooling fluid.

3. The milling tool according to claim 2, including an abutment in the tool base body, which abutment is configured to limit the displacement of the pressure plate.

4. The milling tool according to claim 3, wherein said abutment comprises a fastening ring.

5. The milling tool according to claim 4, wherein said at least one retracting element comprises at least one spring element configured to hold said grinding wheel in the retracted rest position.

6. The milling tool according to claim 5, wherein said at least one spring element comprises a plurality of pressure-spring elements disposed between said abutment and said pressure plate.

7. A tool, being rotatable about an axis, for machining a workpiece, said tool comprising;
   a tool base body, rotatable about said axis, with at least one cutting insert disposed to permit machining of the workpiece for rough-machining;
   a grinding element comprising a grinding surface for finishing the workpiece subsequent to rough machining by said at least one cutting insert;
   said grinding element being configured and disposed to be retracted towards and extended from said tool body;
   said grinding element being adjustably extendable, relative to said tool base body, from a retracted rest position disposed away from a machining position of the grinding element to an extended position which is the machining position of the grinding element, and being adjustably retractable from the extended position to the retracted rest position;
   a displaceable body, mechanically connected to said grinding element, being disposed and configured to displace said grinding element from the retracted rest position to the extended position in contact with a machining surface and from the extended position to the retracted rest position;
   a cooling fluid supply being disposed and configured to supply cooling fluid to said displaceable body and said grinding surface of said grinding element;
   said cooling fluid supply being operatively connected to said displaceable body to communicate cooling fluid to said displaceable body to displace said grinding element from the retracted rest position to the extended position, and to permit retraction of said grinding element from the extended position to the retracted rest position; and
   a passage, operatively connecting said cooling fluid supply to said grinding element, being configured and disposed to supply cooling fluid from said cooling fluid supply to said grinding surface of said grinding element.

8. The tool according to claim 7, wherein:
   said tool further comprises a pressure chamber connected to said cooling fluid supply;
   said displaceable body comprising a wall of said pressure chamber; and
   said passage is open to and connected to said pressure chamber.

9. The tool according to claim 8, wherein said passage comprises a plurality of cooling fluid channels disposed to lead a cooling fluid in a direction towards the grinding surface, and said displaceable body comprises a pressure plate disposed to receive pressure in said pressure chamber from said cooling fluid.

10. The tool according to claim 9, wherein said tool comprises an abutment in the tool base body, which abutment is configured to limit the displacement of the pressure plate.

11. The tool according to claim 10, wherein said abutment comprises a fastening ring.

12. The tool according to claim 11, wherein said tool further comprises a spring element configured to hold said grinding wheel in the retracted rest position.

13. The tool according to claim 12, wherein said spring element comprises a pressure-spring element disposed between said abutment and said pressure plate.

14. The tool according to claim 13, wherein said cooling fluid supply is in the form of an aerosol generator.

* * * * *

UNITED STATES PATENT AND TRADEMARK OFFICE
CERTIFICATE OF CORRECTION

PATENT NO. : 8,171,608 B2  
APPLICATION NO. : 11/952486  
DATED : May 8, 2012  
INVENTOR(S) : Dirk Kammermeier et al.

Page 1 of 1

It is certified that error appears in the above-identified patent and that said Letters Patent is hereby corrected as shown below:

IN THE CLAIMS

In Column 18, Lines 7-8, in Claim 7, after "extended position", delete "in contact with a machining surface".

Signed and Sealed this  
Ninth Day of April, 2013

Teresa Stanek Rea  
*Acting Director of the United States Patent and Trademark Office*